United States Patent [19]
Fisher

[11] 3,765,278
[45] Oct. 16, 1973

[54] ALIGNMENT OF SHELL ONTO MANDREL
[75] Inventor: Simon Fisher, Bay City, Mich.
[73] Assignee: Newcor, Inc., Bay City, Mich.
[22] Filed: Aug. 2, 1971
[21] Appl. No.: 168,104

[52] U.S. Cl.............................. 82/2.5, 82/3, 214/1 R
[51] Int. Cl.............................................. B23b 13/04
[58] Field of Search........................ 214/1 R; 82/2.5, 82/3

[56] References Cited
UNITED STATES PATENTS
1,794,424   3/1931   Smith et al........................... 82/2.5 X
2,249,148   7/1941   Lovely et al........................... 82/2.5
2,747,450   5/1956   Tabet..................................... 82/2.5

Primary Examiner—Leonidas Vlachos
Attorney—Woodhams, Blanchard and Flynn

[57] ABSTRACT

An apparatus for accurate axial aligning of a hollow workpiece. An expandable mandrel is loosely receivable within the workpiece and capable of expansion into firm fixed contact therewith for supporting and locating same. Positioning means are disposed adjacent to and outside of the workpiece substantially in radial opposition to the mandrel, the positioning means including shoes for contacting the exterior wall of the workpiece at first and second circumferentially spaced points thereon. The shoes are supported on the positioning means for limited movement with respect thereto substantially axially of the mandrel. Means are provided for supporting the positioning means for linear and universally pivotal movement and for urging same toward the workpiece and mandrel for causing the shoes to engage the workpiece, forcible engagement of the workpiece by the positioning means prior to expansion of the mandrel causing the workpiece to contact and become precisely axially aligned with the mandrel, the contact and alignment being maintained as the mandrel expands into gripping relation with the workpiece.

13 Claims, 21 Drawing Figures

INVENTOR
SIMON FISHER
BY
Woodhams, Blanchard & Flynn
ATTORNEYS

ALIGNMENT OF SHELL ONTO MANDREL

FIELD OF THE INVENTION

This invention relates to an apparatus for accurately aligning a shell-like workpiece on at least one mandrel which is adapted for use in a machining apparatus and more particularly relates to an apparatus of the type describable engageable with the side of the workpiece for firmly holding same against said mandrel disposed therewithin during movement of said workpiece and during expansion of the mandrel for assuring precise axial alignment of the workpiece with the expanded mandrel.

BACKGROUND OF THE INVENTION

Although a variety of means are known for positioning a hollow workpiece for machining portions, for example the ends, thereof the previously known positioning expedients have been found unsatisfactory where a high degree of accuracy and repeatability is required in positioning the workpiece.

More particularly, the present invention arose in connection with a need for a device for positioning hollow cylindrical shells, in one instance electric motor stator frames, for accurately machining the ends thereof to lie within planes which are, within very low tolerances, perpendicular to the axis of the stator frame and to do so on a high production basis. To the best of my knowledge, substantially all manufacturers of motor frames stipulate the same limiting specifications or tolerances, namely, 0.0015 inch parallelity maximum and 0.003 inch total indicator run-out, whereas in practice, virtually no one achieves this. The parallelity figure indicates the closeness with which the planes of the two machined ends are desired to parallel each other. The total indicator run-out figure is the allowable deviation of a stator frame shell end from perpendicularity to the axis of the shell.

In the past it has been common to attempt to achieve accurate machining of the ends of such shells by machining both ends of the shell in a single chucking on a mandrel, as, for example, by two tools disposed on opposite ends of the shell and operating simultaneously thereon. Machining of both ends in a single chucking would be expected to minimize errors in parallelism of the machined ends and perpendicularity thereof to the shell axis, since the shell remains in fixed relation to the mandrel during both end machining operations.

However, I have found it desirable, for production reasons which need not be discussed in detail here, to carry out the machining of the two ends of the shell in two sequential steps rather than simultaneously and with the workpiece shell being separately chucked for each of the two machining steps. Further, I have found it desirable to chuck the workpiece on one mandrel for machining the first end and on a different mandrel for machining the second end. This approach, however, tends to compound the difficulty in meeting close parallelity and total indicator run-out tolerances, such as those mentioned above, by introducing into the process a further potential source of error. More particularly, the workpiece shell, particularly axially short workpiece shells, may become cocked with respect to the axis of the mandrel before or while being chucked thereon. Thus, not only may the axes of the mandrel and workpiece shell be nonparallel during the first chuckings but the circumferential orientation of the workpiece shell and its angular deviation from axial parallelism with the mandrel may differ as between the first and second chuckings. Consequently, the two machined ends may be not only non-parallel but may slope with respect to the axis of the workpiece axis in different directions and to different extents. In this manner, the problem of meeting close parallelity and total indicator run-out tolerances is compounded if the two ends of the shell are machined in separate chuckings.

Although the present invention arose in connection with a problem involving machining of shell-like motor stator frames on a high production basis, and a preferred embodiment of the invention will be described below in terms of such use, it is contemplated that the present invention may be used in other contexts as well, including chucking of hollow workpieces of other types in precisely aligned relationship with the axis of a supporting and gripping device for any of a variety of purposes.

Accordingly, the objects and purposes of the present invention include provision of:

An apparatus for accurate axial aligning of a hollow workpiece.

An apparatus, as aforesaid, capable of providing accurate alignment of a hollow, substantially cylindrical shell, such as a motor stator frame, for end machining and capable of providing machined shell ends which are parallel to each other and perpendicular to the axis of the shell within very close tolerances.

An apparatus, as aforesaid, capable of meeting target standards for parallelity and total indicator run-out of 0.0015 inch and 0.003 inch, respectively, in machining the ends of motor stator frames.

An apparatus, as aforesaid, capable of facilitating accurate machining of shell ends despite a separate chucking of the workpiece for each end machining operation.

An apparatus, as aforesaid, in which at least one expandable mandrel is provided for internally gripping and ultimately positioning the workpiece for machining or the like operations and in which positioning means are provided for additionally positioning the workpiece with respect to the mandrel prior to and during expansion of the mandrel and in a manner to prevent the workpiece from becoming cocked and remaining cocked with respect to the axis of the mandrel during expansion of the mandrel into gripping relation with the workpiece.

An apparatus, as aforesaid, in which the positioning means is capable of maintaining contact with the workpiece despite movements of the workpiece in a variety of directions and planes during movement of the workpiece into a desired positional relationship with respect to the mandrel and during expansion of the mandrel into supporting relation with the workpiece.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing an apparatus for accurate axial aligning of a hollow workpiece onto at least one mandrel and capable of expansion into firm fixed contact therewith for supporting and locating same. Positioning means are disposed adjacent to and outside of the workpiece substantially in radial opposition to the mandrel, the positioning means including contact means capable of contacting the exterior wall of the workpiece at first and second circumferentially spaced points thereon. Means are provided for supporting said contact means on said positioning means for at least limited movement with respect thereto in at least one direction. Support means are provided for supporting the positioning means for universally pivotal motion with respect to the support means and for urging same toward the workpiece and mandrel for causing the contact means to engage the workpiece, forcible engagement of the workpiece by the positioning means prior to expansion of the mandrel causing said workpiece to become precisely axially aligned with the mandrel, the contact and alignment being maintained as the mandrel expands into gripping relation with the workpiece.

DETAILED DESCRIPTION

Figure 1:
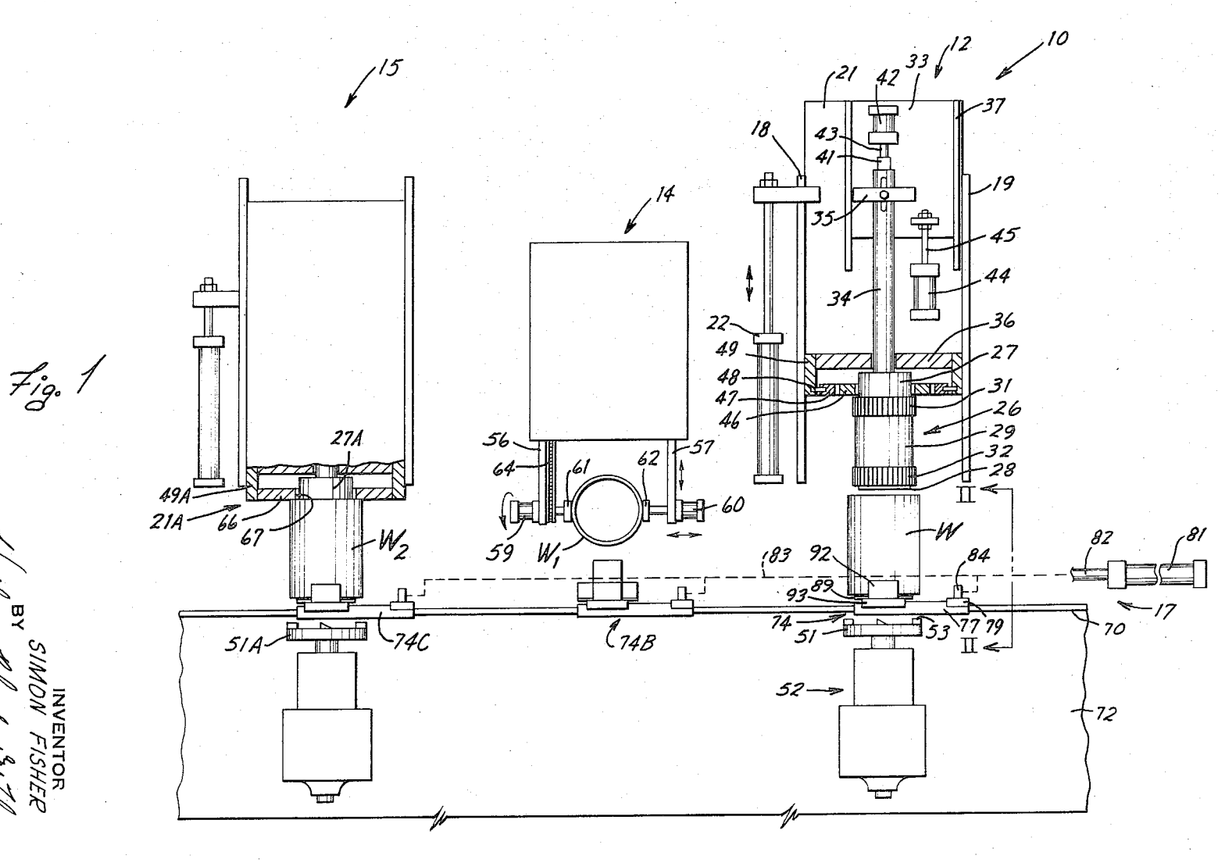
FIG. 1 is a diagrammatic, partially broken, and fragmentary front elevational view of a shell end machining apparatus incorporating the present invention.

FIG. 1 discloses diagrammatically a machining apparatus 10 embodying the present invention and illustrating a preferred working environment for a workpiece alignment apparatus which more specifically embodies the invention and is hereinafter discussed in detail.

The particular embodiment of the apparatus 10 shown was developed in connection with machining within very close tolerances of the ends of hollow cylindrical workpieces W, in one instance motor stator frames. For purposes of illustration of the invention, the following discussion treats the apparatus 10 and parts thereof in terms of this use, though it will be understood that the invention is not limited to such particular use.

In connection with the machining of such cylindrical workpieces W, it was found that the end machining operations could, for production reasons, best be carried out by machining the ends in sequence rather than simultaneously and more particularly by machining the ends in sequence in separate chuckings of the workpiece W. Thus, the machining apparatus 10 disclosed to illustrate the invention incorporates a first machining station 12 whereat one end of the workpiece W is machined, a turnover station 14 for rotating the workpiece end-for-end, that is through 180°, and a second machining station 15 for machining the other or remaining end of the turned-over workpiece W. Associated with the stations 12, 14, 15 is a conveyor system generally indicated at 17 for supporting the workpieces W and moving same sequentially through the work stations 12, 14 and 15.

The work station 12 preferably comprises a pair of upstanding guide ways 18 and 19 spaced above the conveyor 17. A support 21 is vertically reciprocable along the guide ways 18 and 19 by any convenient means here including a fixed pressure fluid cylinder 22.

The machining station 12 further includes a radially expandable mandrel 26 of any conventional type, preferably one which has an internal actuating member shiftable axially to radially expand an outer shell or shells. The expandible shells may be axially moveable on the mandrel body during expansion as shown, for example, in U. S. Pat. No. 3,357,710, issued Dec. 12, 1967 to J. R. Buck, but are here disclosed axially fixed during expansion and operable in any conventional manner. Thus, in the particular embodiment shown, the mandrel 26 comprises a vertically extending, hollow carrier 27 which carries a force transfer sleeve 29 between expandable sleeve members 31 and 32. Internal pressure applied as desired to the sleeve 29 in any conventional manner, mechanical or with a pressure fluid, effects expansion thereof and of the sleeves 31 and 32.

A secondary support or plate 33 is vertically slideably mounted by guides 37, on the support 21. A hollow shaft 34, fixed to the slideable plate 33 by a support block 35, extends slideably downwardly through an opening in a cross member 36 on the support 21 to pendently support the carrier 27 of the mandrel 26.

An actuating rod 41 extends through the hollow shaft 34 and is coupled in this case at its lower end to mechanical means for expanding the mandrel 26. A pressure fluid cylinder 42 mounted on the plate 33 has a piston rod 43 fixed to the actuating rod 41 for moving same vertically.

A further pressure fluid cylinder 44 is fixedly mounted on the support 21 and has a vertical piston rod 45 fixed to the plate 33 for vertically shifting the plate 33, shaft 34 and mandrel 26 with respect to the support 21.

A gimbal supported abutment ring 46 is carried by the lower end of the support 21 for pivotal movement about two mutually orthogonal axes for axially locating the workpiece W on the mandrel 26 as the mandrel 26 expands. The abutment ring 46 is supported for pivotal movement with respect to a surrounding outer ring 47 by a pair of diametrically opposed pins (not shown) located on an axis substantially perpendicular to the page in FIG. 1 and passing through the axis of the shaft 34. The outer ring 47 is pivotally supported by a further pair of diametrically opposed pins 48 on depending extensions 49 of the support 21. The pins 48 are located at right angles to the axis of the first-mentioned pair of pins (not shown). The abutment ring 46 swivels out of its substantially horizontal plane of FIG. 1, when it is contacted by a workpiece W having a skewed upper end and will maintain firm contact with the upper workpiece end, even if such end is skewed, or at least the majority of such end, and vertically locate the workpiece on the mandrel 26.

The abutment ring 46 loosely surrounds the mandrel carrier 27 but is sized to overlie the adjacent upper end of the workpiece when the latter is telescoped over and gripped by the mandrel 26.

Figure 2:
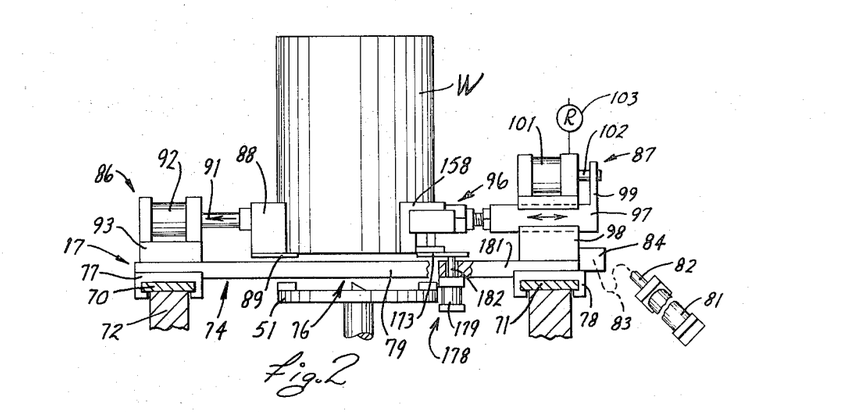
FIG. 2 is an enlarged, partially broken sectional view taken substantially on the line II—II of FIG. 1.

A tool 51 is carried by and selectively rotatable, here about a vertical axis, by motor means 52 of any conventional type. The tool 51 is spaced below the conveyor 17 and mandrel 26 and has an upwardly directed working face 53 for machining the opposed lower end of the workpiece W. Such working face 53 may, for example, be toothed. Although the invention is here described in connection with machining of workpieces, it is contemplated that the tool 51 may be a grinding element or other material working element. As shown in FIG. 2, the tool 51 is preferably coaxial with the mandrel 26.

The turnover station 14 is spaced leftwardly along the conveyor 17 from the first machining station 12, as indicated in FIG. 1. The turnover station 14 may be of any conventional type, here including a pair of vertically movable, depending legs 56 and 57. The legs 56 and 57 here support pressure fluid cylinders 59 and 60, respectively, the piston rods of which extend coaxially toward each other and carry opposed, rotatable shoes 61 and 62 for supporting a workpiece $W_1$ therebetween. Any conventional means (not shown), here including a chain 64, is provided for rotatably driving at least one of the shoes, here the shoe 61. The turnover station 14 is thus equipped for picking up a workpiece $W_1$ from a conveyor 17, rotating it through 180° in a plane transverse to the length dimension of the conveyor 17, and then replacing the workpiece $W_1$ in an upturned condition on the conveyor 17, for movement to the second machining station 15.

The second machining station 15 is preferably identical to the first machining station 12, above discussed, except as hereinafter described. Described portions of the second machining station 15 substantially identical to corresponding parts of the machining station 12 will be referred to by the same reference numerals thereas with the suffix "A" added thereto.

The machining station 15 differs from the machining station 12 in that the ring 46 with its mounting gimbal structure is replaced by a fixed, preferably horizontal abutment plate 66, fixedly supported on and between the extensions 49A. The abutment plate 66 has a preferably central opening 67 through which is received the expanding mandrel carrier 27A. The central opening 67 is sized so that the plate 66, adjacent the central opening 67, overlies and can receive in abutting contact therewith the upper end of the workpiece $W_2$ located therebelow, so as to limit upward movement of the workpiece W relative to the vertically slidable support 21A.

FIG. 1 discloses, for the sake of illustration, the support 21A in a position intermediate the limits of its vertical path of travel whereas the support 21 is shown at its upper limit of travel. However, it is contemplated that, in actual operation of the machining apparatus 10, the supports 21 and 21A would, at a given moment, normally occupy the same vertical position.

The conveyor 17 extends past the stations 12, 14 and 15 for carrying workpieces thereto and therebetween.

In the particular embodiment shown, the conveyor 17 comprises a pair of parallel and preferably horizontally and transversely spaced rails 70 and 71 (FIGS. 1 and 2) carried by a fixed support 72. In the particular embodiment shown, the rails 70 and 71 are located vertically between the tools 51 and 51A and the remainder of the stations 12, 14 and 15.

The conveyor 17 in addition comprises a plurality of carriages, ones of which are indicated at 74, 74B and 74C, adjacent the work stations 12, 14 and 15. The several carriages are preferably identical and hence description of one thereof will suffice for all. Thus, the carriage 74 comprises a preferably U-shaped framework 76 (FIGS. 1 and 2) having a pair of legs 77 and 78 which extend along and are slideably supported on the respective rails 70 and 71. The legs 77 and 78 are joined by a cross member or bight element 79 adjacent the rearward (rightward) ends thereof. If desired, conventional anti-friction means may be interposed between the rails and carriage legs 77 and 78. The transverse spacing of the rails 70 and 71, and of the carriage legs 77 and 78, exceeds the outside diameter of the workpiece W so that the latter, when supported on the mandrel 26, may pass downwardly therebetween and into end contact with the tool 51 for machining.

The several carriages are reciprocable along the rails 70 and 71, preferably in unison, by any convenient means, here comprising a pressure fluid cylinder 81 (FIGS. 1 and 2) aligned with the rails 70 and 71 and having an extensable piston rod 82 connected by any convenient means, schematically indicated by the broken line 83, to a drive element 84 on each of the carriages. The stations 12, 14 and 15 are preferably evenly spaced along the conveyor 17 and the stroke of the piston rod 82 is preferably sufficient to reciprocate each of the carriages between an adjacent pair of such stations. Thus, the carriages 74, 74B and 74C of FIG. 1 are preferably reciprocable, respectively, between the work station 12 and a loading station (not shown) to the right thereof, between the stations 12 and 14, and between the stations 14 and 15. In addition, a further carriage (not shown) is preferably provided for similarly removing a workpiece from the station 15 to an unloading station (not shown) located to the left of the station 15.

Although the reciprocating conveyor 17, to the extent above described, has been found most suitable, it is contemplated that conveyors of other types, such as endless conveyors, may be utilized if properly arranged to carry out the conveying operations of the apparatus 10 hereinafter described.

The carriages provided with preferably identical work positioning means and, again, a description of the work positioning means of the carriage 74 will suffice for all. Such means of the carriage 74 comprise a diametrically opposed pair of work positioning units 86 and 87 (FIG. 2) carried respectively by the carriage legs 77 and 78 forwardly (or as seen in FIG. 1 leftwardly) of the cross member 79.

The positioning units 86 and 87 support the workpiece on the carriage 74 during portions of the cycle of operation of the apparatus 10, to properly locate the workpiece W with respect to the mandrel 26 and remaining portions of the apparatus 10 at such times and for further purposes hereinafter discussed.

The positioning unit 86 (FIG. 2) acts as a fixed but removable position stop for the workpiece W. When at the position shown in FIG. 2, the positioning unit 86 establishes the leftwardmost limiting position of the workpiece W whereat the workpiece is centered beneath the mandrel 26.

The mandrel 26 when in its contracted condition is of diameter less than the inside diameter of the workpiece W and is thus axially slidably receivable within the workpiece. The mandrel 26 is expandable to a diameter exceeding the inside diameter of the workpiece. More particularly, the mandrel 26 when located within the workpiece W may be expanded radially to firmly grip the interior wall of the workpiece for supporting same.

The positioning unit 86 includes a workpiece contact element or stop block 88 of any convenient type, preferably having a face (not shown) configured to the shape of the workpiece for contacting same. The stop block 88 is preferably provided with a radially inwardly extending flange 89 arranged for underlying the adjacent lower edge portion of the workpiece W for assisting in vertically supporting same. In the particular embodiment shown, the block 88 is fixed to the end of the piston rod 91 of a pressure fluid cylinder 92. The pressure fluid cylinder 92 is, in turn, fixedly supported by a mounting block 93 of any convenient type on the carriage leg 77.

The piston rod 91, with the stop block 88 carried thereby, has a fixed rightward limiting position, shown in FIG. 2, which defines the above-mentioned leftward limiting position of the workpiece W at a location centered below the mandrel 26. The pressure fluid cylinder 92 is arranged to maintain the stop block 88 in its rightwardmost limiting position despite a relatively substantial leftward pressure on the workpiece W. By appropriate actuation of the cylinder 92, the piston rod 91 and stop block 88 may be withdrawn leftwardly from their position shown in FIG. 2 so that the stop block 88 and flange 89 vertically clear the workpiece W, to allow downward movement of the workpiece W therepast and toward the tool 51.

Thus, the stop block 88 is carried for transverse reciprocation with respect to the carriage 74 and the mounting of the stop block 88 is preferably sufficiently rigid as to prevent significant movement of the stop block axially of the workpiece W. Although the mounting of the stop block 88 shown in FIG. 2 will normally be satisfactory, it is contemplated that in certain instances it may be desirable instead to mount the stop block 88 on a suitable slide (not shown) reciprocable laterally on a fixed guide way (not shown) by means such as the pressure fluid cylinder 92, i.e., generally in the manner of the positioning unit 87 discussed hereinafter.

The positioning unit 87 (FIG. 2) comprises a positioning member 96 carried on the leftward (inner) end of a transversely reciprocable slide member 97. The slide member 97 is supported for lateral sliding movement with respect to the carriage 74 on a guide member 98 fixedly supported on the leg 78 of the carriage 74. The guide member 98 is laterally opposed to the mounting block 93, so as to place the positioning member 96 in opposition to the stop block 88 whereby the workpiece W may be positioned diametrically therebetween.

The slide member 97 is preferably provided with an upstanding arm 99. A motive power device, preferably a pressure fluid cylinder 101, is fixed on the guide member 98 and has a piston rod 102. The free end of the piston rod 102 is engaged fixedly with the arm 99 of the slide member 97. The axis of the pressure fluid cylinder 101 is parallel to the direction of movement of the slide member 97 so that extension and retraction of the piston rod 102 results in reciprocation of the slide member 97 with respect to the guide member 98 and carriage 74.

Thus, retraction of the piston rod 102 moves the positioning member 96 to move laterally inwardly toward a workpiece W interposed between the stop block 88 and positioning member 96. The travel of the slide member 97 and piston rod 102 is sufficient to enable the positioning member 96 to forcibly press the workpiece W against the stop block 88. The pressure fluid cylinder 101 is arranged to resiliently urge the positioning member 96 against the workpiece W, and hence the workpiece W against the stop block 88, with a force less than that applied to the stop block 88 by the cylinder 92. Thus, the stop block 88 remains unmoving in its rightward limiting position of FIG. 2 when the cylinder 101 moves the positioning member 96 inwardly to force the workpiece W against the stop block 88. Thus, the stop block 88 and positioning member 96 act in concert to accurately locate the workpiece W fixedly with respect to the carriage 74 and substantially coaxially beneath the mandrel 26. The lateral force generated by the cylinder 101 may be maintained less than that supplied by the cylinder 92 in any of several conventional ways. For example, if the cylinders 92 and 101 are actuated by air pressure, a piston of smaller diameter may be used in the cylinder 101 than in the cylinder 92. Alternatively, the cylinder 101 may be supplied a lesser pressure, such as by introduction of a pressure reducer 103 into the air supply line of the cylinder 101. Thus, the stop block 88 can be maintained fixedly located as the positioning member 96 urges the workpiece W leftwardly thereagainst.

Generally speaking, the positioning member 96 includes a yoke having workpiece engageable means and which is mounted for limited pivotal movement about three mutually perpendicular axes with respect to the slide member 97 by a spindle to achieve a "wrist action." Within the broader aspects of the invention it is contemplated that the yoke may be so mounted in a variety of ways, for example, by use of a ball joint or by rotatably mounting the spindle on the slide member 97 and interposing a trunnion type universal joint between the yoke and spindle. However, such mountings are not preferred, being for example, unduly complex and costly, particularly, when provided with appropriate means for limiting the extent of pivotal motion. Thus, a different and less expensive approach is preferred, such being immediately hereinafter described.

Turning now more particularly to the detailed construction of the positioning member 96, which positioning member embodies the more specific aspects of the invention, the positioning member 96 comprises a spindle 106 (FIG. 6) having a shank 107 which is threadedly engaged within an axially extending bore 108 within the inner or leftward end of the slide member 97. Thus, the relative lateral location of the positioning member 96 and slide member 97 may be adjusted by rotation of the spindle 106 with respect to the slide member 97. A lock nut 109 is preferably provided on the shank 107 to fix the spindle 106 with respect to the slide member 97 once a proper axial adjustment therebetween has been effected. The spindle 106 further includes an enlarged head 111 (FIGS. 6, 9 and 10) of circular cross section integral with the leftward end of the shank 107. A groove 112 of rectangular cross section is centrally located in the free or leftward end of the head 111 and extends upwardly therethrough for purposes appearing hereinafter. The depth of the groove 112 preferably exceeds its width.

The positioning member 96 further includes a preferably bilaterally symmetrical yoke 115 (FIGS. 4, 5 and 10) supported at its center for limited linear and pivotal movement in three mutually orthogonal planes, in a manner hereinafter described, by the head 111 of the spindle 106. The yoke 115 includes an elongate bight or central portion 116, preferably of rectangular cross section. The central portion 116 extends in opposite directions and substantially at right angles from the spindle 106.

Extending integrally from the opposite ends of the central portion 116 are legs 118 and 119 which are preferably mirror images of each other. The legs 118 and 119 are angled with respect to the central portion 116 and extend both longitudinally and leftwardly, in the direction of the workpiece W and the opposed positioning unit 86, from the central portion 116. The free end portions 121 and 122 of the legs 118 and 119, respectively, are preferably vertically thickened, having an upper surface which is stepped above the upper surface of the inner portion of the legs 118 and 119 and of the central portion 116. The free ends 121 and 122 each have an upstanding inner face 124 (FIG. 9) which faces laterally toward the workpiece W and is preferably at least approximately tangential to a circle drawn from the central axis of the workpiece W when the workpiece is gripped between the positioning units 86 and 87 (FIG. 2). In the particular embodiment shown, the faces 124 of the yoke free ends 121 and 122 lie at an angle of 90° to each other. The legs 118 and 119 preferably have outer upstanding faces 126 (FIG. 9) which parallel respective ones of the faces 124.

A preferably rectangular cap block 128 (FIGS. 5, 6 and 10) is located atop and is preferably centered with respect to, the central portion 116 of the yoke 115. The cap block 128 is fixed to the yoke 116 by screws 129 which extend downwardly through the cap block 128 and threadedly engage the yoke 116 on opposite sides of the central axis of the yoke, the spacing of the screws 129 exceeding, by a margin, the diameter of the spindle head 111.

The cap block 128 and central portion of the yoke 115 have vertically opposed, centered recesses 131 and 132, respectively, in the lower and upper faces thereof, respectively. The recesses 131 and 132 extend at right angles and horizontally through the width of the cap block 128 and the yoke 115 to form, in the assembled cap block and yoke, a circular cylindrical opening into which the spindle head 111 is loosely receivable.

The cap block 128 and the central portion 116 of the yoke 115 are also provided with coaxial vertical holes 136 and 137, respectively, (FIGS. 6 and 10) which are preferably centrally located therein and define a common axis which is coplanar with and lies at right angles to the axis of the larger opening defined by the circular recesses 131 and 132. The common axis of the holes 136 and 137 substantially lies on the central plane of the slot 112 in the spindle head 111 when such spindle head is positioned within the recesses 131 and 132 as shown in FIGS. 4-10.

A pivot limiting pin 139 (FIGS. 4, 6, 9 and 10) has a central portion 141 of noncircular, preferably square, cross section which is loosely receivable within the slot 112 in the spindle head 111. The axial length of the central portion is preferably somewhat less than the diameter of the spindle head 111. The pin 139 has upper and lower ends 143 and 144, respectively, which extend axially beyond the central portion 141 thereof and are of circular cross section.

In the particular embodiment shown, the diameter of the ends 143 and 144 is equal to the thickness of the square cross section central portion of the pin 139, taken across the flats thereof.

The ends 143 and 144 are received with a snug sliding fit within the holes 136 and 137, respectively, in the cap block 128 and the central portion 116 of the yoke 115. The ends 143 and 144 extend preferably to the outer faces of the cap lock and yoke. One of the ends 143 and 144, in the particular embodiment shown the upper end 143, has a flat 146 on the side thereof. The flat 146 is engaged by a horizontal set screw 147 (FIG. 6) threaded through the outer (rightward) face of the cap block 128. Thus, the set screw 147 securely holds the pin 139 with respect to the cap block 128 and yoke 115 for preventing relative axial or rotational movement of the pin 139 with respect thereto.

An end cap 150 (FIGS. 4, 6, 7 and 9) is loosely received in the inner (leftward) end of the opening defined by the semi-circular recesses 131 and 132 in the cap block 128 and yoke 115 and abuts and covers the free end of the spindle head 111. The diameter of the end cap 150 preferably is the same as that of the spindle head 111. The end cap 150 is secured to the spindle head 111 by any convenient removable means, such as a pair of machine screws 151. The interior face of the end cap 150 has a central, cylindrical extension 52 (FIGS. 6 and 9) having a radial end face 153. The extension 152 extends into the slot 112 in the spindle head 111. The extension 152 preferably snugly fits laterally within and between the side walls of the slot 112. Substantial clearance 155 (FIG. 6) is provided between the top and bottom faces of the extension 152 and the opposed faces of the recesses 131 and 132. Thus, by means of the end cap 150, the spindle head 111 is loosely secured to the pin 139 and thus to the yoke 115 for allowing limited linear movement of the yoke 115 in three mutually othogonal planes with respect to the spindle 106 and also for allowing limited pivotal movement of the yoke about three mutually othogonal axes with respect to the spindle.

In the particular embodiment shown, the difference between the width of the slot 112 and the corresponding thickness of the central pin portion 141 is between 0.029 and 0.035 inch and preferably between 0.31 and 0.034 inch. The distance between the bight wall of the slot 112 and the opposed end of the end cap extension 153 preferably exceeds the corresponding thickness of the pin portion 141 by a similar clearance dimension. Also in the particular embodiment shown, the diameter of the hole defined by the recesses 131 and 132 preferably exceeds the outside diameter of the spindle head 111 and end cap 150 by approximately 0.031 inch. In an instance in which these clearances were used, the diameter of the spindle head 111, for example, was 1 inch. Although not preferred, a wider range of clearances may be permitted, for example, a range of from 0.015 inch to 0.050 inch. Further, in situations in which the relative size of the components is substantially enlarged or reduced, it is desirable to correspondingly enlarge or reduce the clearances above mentioned in order to maintain substantially the same range of pivot angles and linear travel of the yoke 115 with respect to the spindle 106.

A pair of preferably U-shaped shoes 157 and 158 (FIGS. 4, 5 and 7–10) loosely fit over and are carried by the free ends 121 and 122, respectively, of the yoke 115. The shoes 157 and 158 are preferably mirror images of each other. Each of the shoes 157 and 158 has an upstanding, platelike bight portion 160 and a pair of preferably integral, vertically spaced parallel arms 161 and 162 (FIG. 8) which extend from the upper and lower ends, respectively, of the bight portion 160. The arms 161 and 162 are spaced apart by a distance exceeding the vertical thickness of the free yoke ends 121 and 122 by a distance indicated at "A" in FIG. 8. In the particular embodiment shown, the distance "A" is 0.44 inch but it is contemplated that such may vary over a range of 0.25 to 0.75 inch or indeed vary outside this range depending upon the extent of vertical movement of the expandable sleeves 31 and 32 of the mandrel 26 during radial expansion thereof. The spacing "A" preferably exceeds such vertical movement of the sleeves 31 and 32 with respect to the carrier 27.

Vertical and preferably substantially centrally located holes 164 (FIGS. 8 and 9) extend through each of the free end portions 121 and 122 of the yoke 115. Coaxial holes 166 and 167 are provided through the arms 161 and 162 of each of the shoes 157 and 158 adjacent the free ends thereof.

A preferably cylindrical pin 168, of height corresponding to that of the shoes 157 and 158 extends through each of the holes 164 in free ends of the yoke 115 and extends into of the holes 166 and 167 in the arms of the corresponding shoes 157 and 158. A set screw 169 is threaded in one of the arms, preferably the upper arm 161, of each of the shoes 157 and 158, for radially contacting the periphery of the pin 168 to hold the pin in fixed axial and circumferential location with respect to the corresponding shoe. The upstanding bight portions 160 of the shoes 157 and 158, respectively, preferably clear the opposed faces of the yoke free ends 121 and 122. The bight portions 160 of the shoes 157 and 158 each have a workpiece contacting face 171 on the side thereof opposite the yoke 115.

A work support plate 173 (FIGS. 7–10) extends between and is fixed to the lower faces of the lower shoe arms 162. In the particular embodiment shown, the lower shoe arms 162 extend inwardly toward the spindle 106 somewhat further than do the upper shoe arms 161. The lower shoe arms 162, inboard of the pins 168, are each threadedly engaged by a pair of mounting screws 174 which extend through the adjacent ends of the plate 173 for rigidly interconnecting the plate 173 and shoes 157 and 158. The plate 173 maintains the bight portions of the shoes 157 and 158 preferably parallel the inner faces 124 of the corresponding yoke end portions 121 and 122. The shoe faces 171 preferably centrally and tangentially engage the peripheral wall of the workpiece W when both such shoes 157 and 158 firmly contact the workpiece, the pins 164 preferably being located on radii of the workpiece W passing through the respective lines of tangency of the shoes 157 and 158 and workpiece. However, the diameter of the workpiece may vary, so as to change the location of contact with the workpiece on the shoe faces 171 rather substantially, as long as some portion of the faces 171 of the shoes contact the workpiece.

Figures 8, 9, 10:
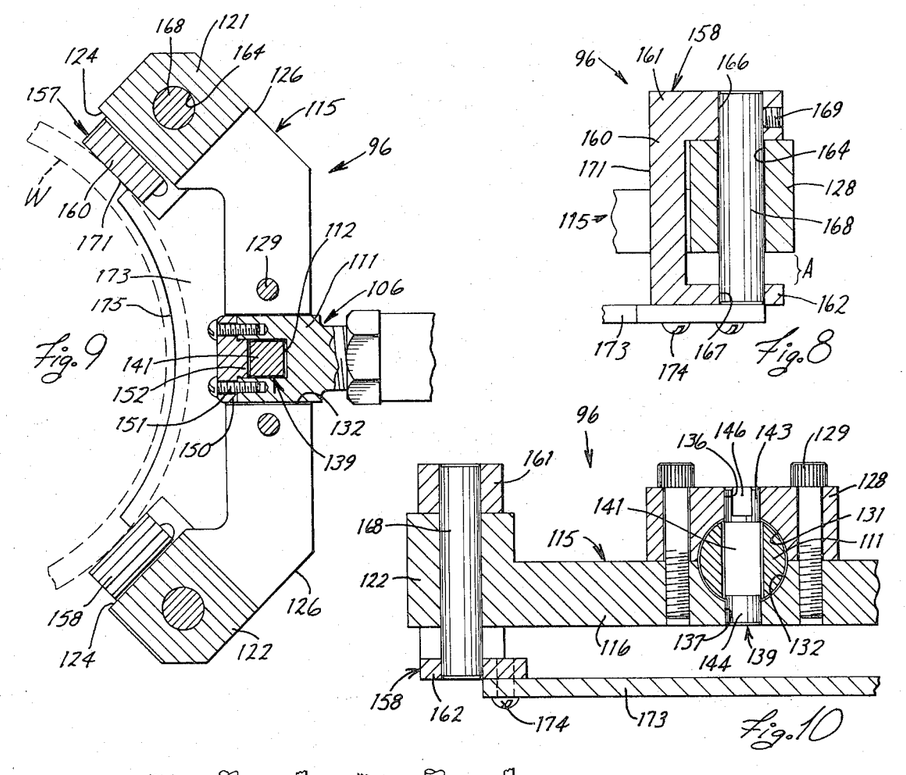
FIG. 8 is a sectional view substantially taken on the line VIII—VIII of FIG. 4.
FIG. 9 is a sectional view substantially taken on the line IX—IX of FIG. 5.
FIG. 10 is a sectional view substantially taken on the line X—X of FIG. 4.

As seen in FIG. 9, the plate 173 has a concave, semicircular leftward edge 175 which extends leftwardly beyond the work contacting faces 171 of the shoes 157 and 158 for underlying the bottom edge of the workpiece for supporting the workpiece vertically.

In the particular embodiment shown, the edge 176 (FIG. 5) of the plate 173 opposite the workpiece contacting edge 175 underlies and follows a configuration of the rightward edge of the yoke 115.

In certain instances, it may be desired to provide means, generally indicaed at 178 in FIG. 2, for urging the shoes 157 and 158 upwardly at selected times in the operation of the apparatus 10, as hereinafter discussed. To this end, a vertically oriented pressure fluid cylinder 179 is fixed, here pendantly, to a suitable horizontal support beam 181 cantilevered inwardly toward the workpiece and positioning member 96 from the rightward leg 78 of the carriage 74 and to a point below the workpiece support plate 173 of the positioning member 96. The beam 181 and cylinder 179 are disposed radially outwardly or rightwardly from the workpiece in such a manner as to provide vertical clearance for moving the workpiece downwardly therepast and into contact with the tool 51. The cylinder 179 has a piston rod 182 which extends upwardly past the cantilevered beam 181 and is adapted to engage the underside of the work support plate 173, the cylinder 179 being actuable as desired to urge the plate 173 and hence the shoes 157 and 158 upwardly.

OPERATION

Although the operation of the mechanism described will be understood from the foregoing description by skilled persons, a summary of such operation is now given for convenience.

FIGS. 3A through 3J schematically indicate steps of a cycle of operation of either of the machining stations 12 and 15 of FIG. 1 and also indicate the general operation of the positioning member 96.

FIGS. 3A through 3J are each taken from the input or rightward end, as seen in FIG. 1, of the conveyor 17 and thus correspond generally to FIG. 2 in orientation. FIGS. 3A through 3J will be discussed below with reference to the machining station 12, although, unless otherwise stated, the following discussion will be equally applicable to the second machining station 15.

More particularly then the carriage 74 is initially positioned to the right of its position of FIG. 1, at a workpiece loading station (not shown), with the stop block 88 thereof held in its rightwardmost (inner) limiting position of FIG. 2 by the cylinder 92 and the positioning member 96 in its rightwardmost (withdrawn or outer) position (not shown). The workpiece W is then lowered between the stop block 88 and the positioning member 96 and the cylinder 101 is actuated to move the positioning member 96 leftwardly (inwardly) until the shoes 157 and 158 firmly bear against the workpiece W, with the workpiece W resting on the flange 89 and workpiece support plate 173, as shown in FIG. 2.

Figures 4, 5, 6:
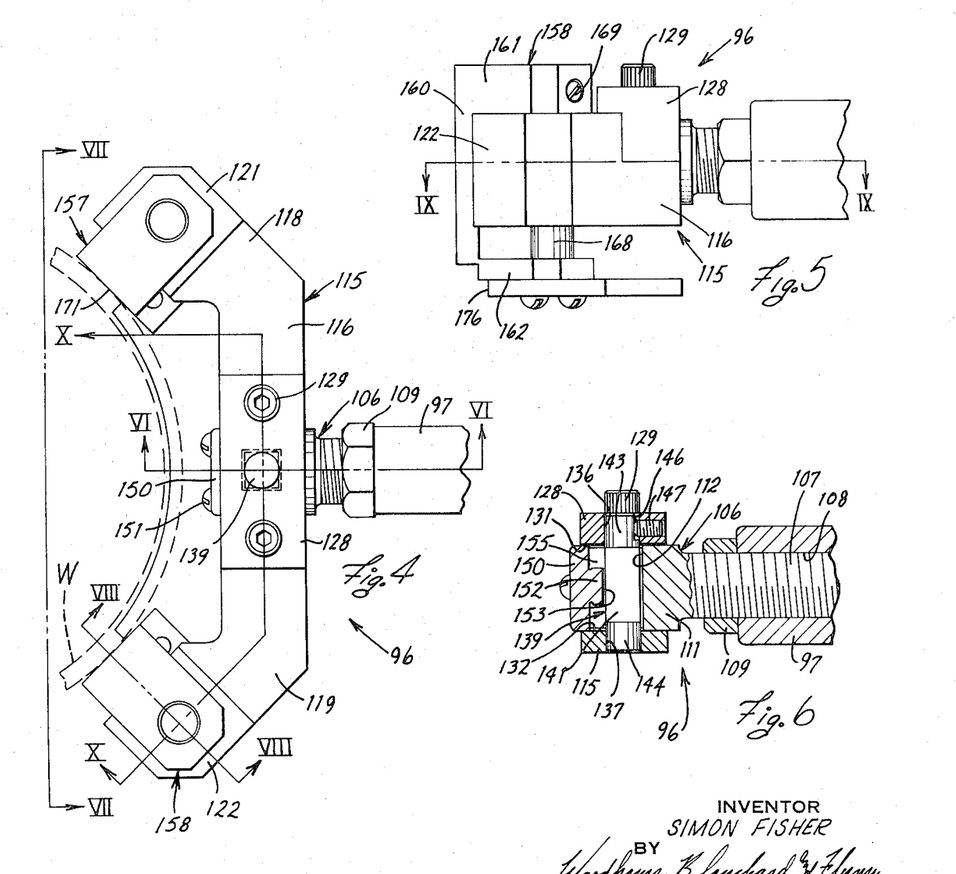
FIG. 4 is an enlarged top elevational view of the positioning member of FIG. 2.
FIG. 5 is a side elevational view of the apparatus of FIG. 4.
FIG. 6 is a sectional view substantially taken on the line VI—VI of FIG. 4.
Figure 7:
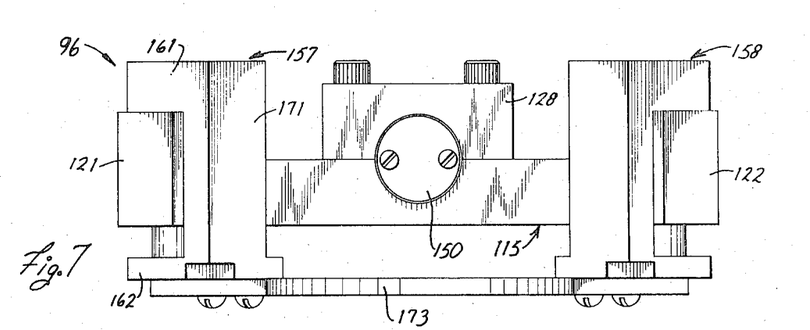
FIG. 7 is a sectional view substantially taken on the line VII—VII of FIG. 4.

As the positioning member 96 so moves into contact with the workpiece W, the shoes 157 and 158 will be in their lowermost position with respect to the yoke 115, as shown for example in FIG. 5. Moreover, because of the ability of the yoke 115 to pivot to a limited extent on the pin 139 in any direction, that is, about any of three mutually othogonal axes, the shoes 157 and 158 will tend to each establish a vertical line contact with the periphery of the workpiece W over the entire height of the contact faces 171 thereof.

Figure 3A:
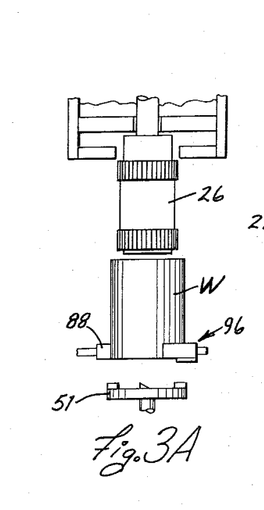
FIGS. 3A through 3J are diagrammatic views of reduced size corresponding generally to FIG. 2 and disclosing a sequence of operations of the apparatus of FIG. 1.

As the workpiece W is moved leftwardly (FIG. 1) with the underlying carriage 74, by extension of the pressure fluid cylinder 81, into at least substantially coaxial alignment with the mandrel 26, the further workpieces $W_1$ and $W_2$ are moved by the corresponding carriages 74B and 74C to positions beneath the subsequent work stations 14 and 15 for further action thereby as hereinafter described. FIG. 3A discloses the workpiece W so positioned at the work station 12 beneath the elevated and unexpanded mandrel 26, the workpiece W being supported above the tool 51 by the stop block 88 and positioning member 96.

Figures 3B, 3C, 3D, 3G, 3H:
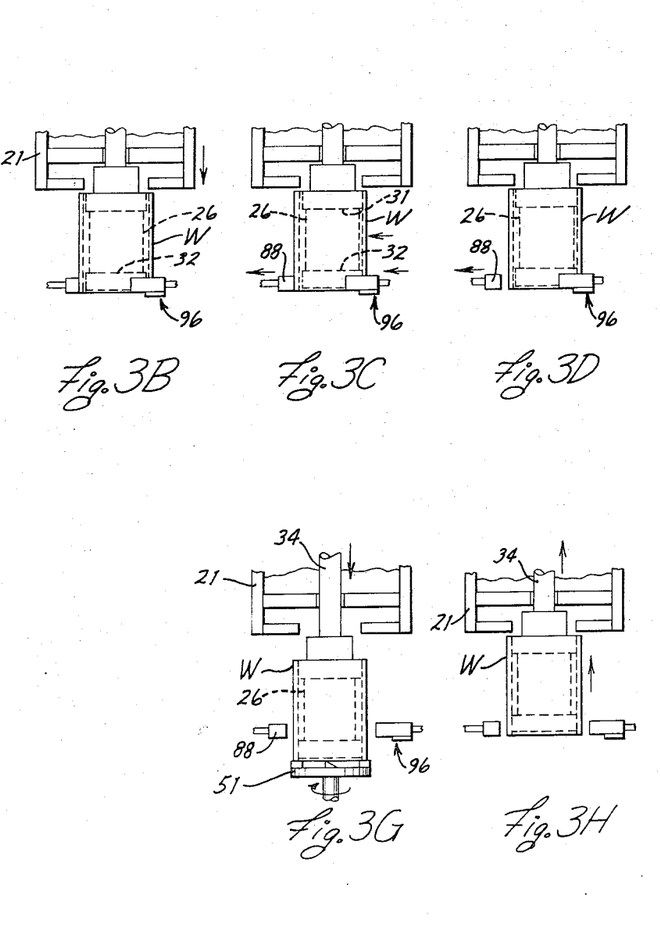

Referring to FIGS. 1 and 3B, the pressure fluid cylinder 22 is then retracted to lower the support 21, and thereby lower the mandrel 26 into loosely telescoped relation within the workpiece W, preferably until the lower expandable sleeve 32 lies adjacent the bottom of the workpiece W and in substantial radial opposition to the shoes 157 and 158 of the positioning member 96, as illustrated in FIG. 3B.

Thereafter, as seen in FIGS. 2 and 3C, the stop block 88 is withdrawn leftwardly and away from the workpiece W by the cylinder 92 while the continuing leftward urging of the fluid cylinder 101 causes the positioning means 96 to move the workpiece leftwardly, following the withdrawing stop block 88, until the rightward side of the workpiece W firmly contacts the corresponding rightward peripheral portions of the expandable sleeves 31 and 32 of the unexpanded mandrel 26. Such contact insures that the workpiece W is in accurate axial parallelism with the mandrel 26.

As the positioning member 96 moves the workpiece an increment leftwardly to firmly engage same with the expandable sleeve 31 and 32 of the mandrel 26, it is the capability of the yoke 115 and hence of the shoes 157 and 158 carried thereby to pivot to a limited extent in any direction which allows the workpiece W to pivot as may be necessary to bring about such firm engagement of the workpiece with the expandable mandrel sleeves 31 and 32 and thereby results in the accurate axial alignment of the workpiece and mandrel.

As indicated in FIG. 3D, this leaves the workpiece W gripped between the shoes 157 and 158 of the opposed positioning member 96 and the rightward side of the mandrel 26 as the stop block 88 disengages the workpiece W and moves further leftwardly to its withdrawn or leftward limiting position shown.

Figures 3E, 3F, 3I, 3J:
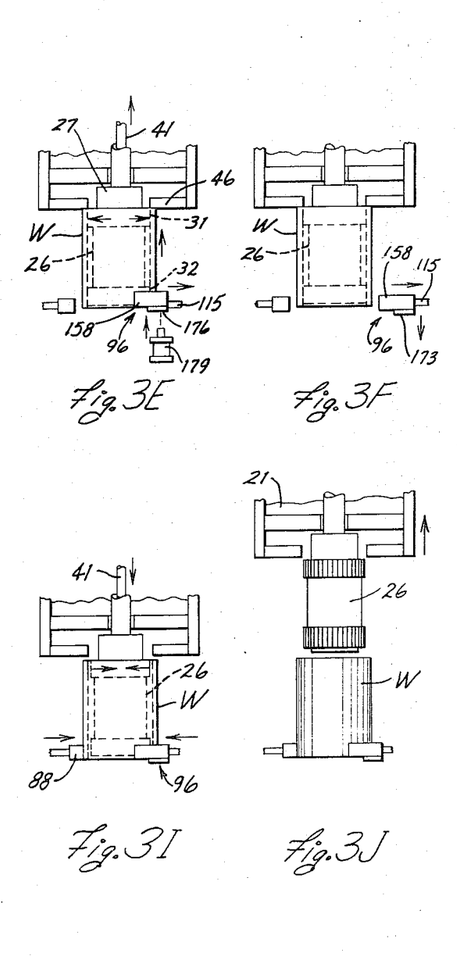

Thereafter, as seen in FIG. 3E, the mandrel 26 is expanded, bringing the expanding sleeves 31 and 32 into full circumferential contact with the workpiece W, here adjacent the top and bottom ends thereof, whereby the workpiece W is firmly gripped and supported by the mandrel 26 in coaxial relationship therewith.

As the mandrel 26 expands into firm gripping contact with the interior of the workpiece W, so as to coaxially locate the workpiece with respect to the mandrel, the workpiece will be shifted slightly rightwardly and will correspondingly push rightwardly the positioning member 96 against the leftward urging thereof by the pressure fluid cylinder 101. The amount of such rightward movement corresponds to the difference in radii of the unexpanded mandrel sleeves 31 and 32 and inside radius workpiece W. The resilient leftward pressure applied to the positioning member 96 by the cylinder 101 is sufficiently small as to be overcome by the radial force of expansion of the mandrel sleeves 31 and 32.

During the expansion of the sleeves 31 and 32 into full circumferential contact with the workpiece W, contact between the rightward portion of the workpiece and the rightward portions of the sleeves 31 and 32 is maintained by the positioning member 96. Thus, throughout the expansion and gripping process, the axes of the mandrel and workpiece are maintained parallel.

In the particular embodiment shown, the mandrel 26 is of the type in which the expandable sleeves 31 and 32 remain axially fixed as they expand. Hence, the workpiece is moved upwardly by the shoes 157 and 158, in response to the cylinders 179, into solid contact with the abutment ring 46 prior to full expansion of the mandrel. Since the abutment ring 46 is gimbal mounted, if the upper end of the workpiece W, (which at the first machining station 12 has not yet been machined) is uneven or sloped, such workpiece upper end will still abut securely against the ring at least at three relatively widely circumferentially spaced points thereon. Thus, the workpiece W will be accurately axially located on the mandrel 26 as the latter then expands to internally grip the workpiece. Such accurate axial location of the workpiece on the mandrel is desirable to avoid excessive or insufficient machining of the lower end of the workpiece at the work station 12.

Since the shoes 157 and 158 rise upwardly with respect to the yoke 115, spindle 106 and slide member 97, all of which are vertically fixed, there is provided the lost motion connection therebetween and more particularly seen in FIG. 8 by the spacing "A" between the lower shoe arms 162 and the bottom of the yoke 115.

Whether supplied by vertical movement of the expandable mandrel sleeves 31 and 32 or by the pressure fluid cylinder 179, the upward force of the workpiece against the ring 46 is not sufficient to overcome the effect of the positioning member 96 in maintaining the axes of the workpiece W and mandrel 26 parallel during expansion of the mandrel.

Once the mandrel 26 is fully expanded into firm gripping and supporting relation with the workpiece W (FIG. 3F) the positioning member 96 is withdrawn rightwardly by reversal of the cylinder 101. Thus, the shoes 157 and 158 are allowed to drop back to their normal downward position on the yoke 115 upon such withdrawal, either solely due to gravity or, where the cylinder 179 is used, by reversal of such cylinder 179 to allow the piston rod thereof to drop away from the plate 173.

Thereafter, as seen in FIG. 3G, with the tool 51 rotated by the motor means 52 (FIG. 1), the plate 33 (FIG. 1), shaft 34, mandrel 26 and workpiece W are lowered with respect to the support 21 through a preselected distance by retraction of the cylinder 44. Thus, the workpiece W is moved downwardly into machining contact with the tool 51. As above discussed, the stop 88 and positioning member 96 are at this time laterally spaced from the workpiece W so as not to interfere with movement of the workpiece W downwardly therebetween toward the tool 51. The tool 51 then machines the bottom end of the workpiece W to render same planar and at right angles to the axis of the workpiece within very close tolerances, such tolerances being consistently achieved by the above-described operation for closely coaxially aligning the workpiece W on the mandrel 26.

Although in the particular embodiment shown, the mandrel 26 and workpiece W are nonrotatable and the tool 51 is rotatable, it is contemplated that the mandrel 26 and workpiece W may be made rotatable in a direction opposite that indicated in FIG. 3G for the tool 51. Such may be carried out, for example, by supporting the upper end of the shaft 34 in a bearing on the plate 33, instead of by means of the block 35, and further by connecting suitable rotative motive power means to such shaft. Such means may, for example, take the form of a motor supported by the plate 33. With the mandrel 26 and workpiece W so made rotatable in their positions of FIG. 3G, the tool 51 may be held stationary by any convenient means or, on the other hand, may be made to rotate in the manner above discussed by the motor means 52. It may further be noted that although a tool 51 of the particular type and particular location with respect to the axis of the workpiece W has been described, it is contemplated that other tool types and locations may be utilized.

Following machining, and referring to FIG. 3H, the rotation of the tool 51 may be stopped. The plate 33, shaft 34, mandrel 26 and workpiece W are moved upwardly by appropriate actuation of the cylinder 44 to return same to their positions of FIG. 3F.

During such sequence at station 12, and in substance at station 15 with respect to workpiece $W_2$, the workpiece $W_1$ is removed from the carriage 74B by upward movement of the legs 56 and 57 of the turnover station 14 and is rotated through 180° by the drive means including the chain 64, the workpiece W1 being shown in FIG. 1 in a position half-way through its 180° rotation.

With the workpieces W, W1 and W2 positioned above the carriages 74, 74B and 74C (corresponding to the position of the workpiece W1 at the turn-over station 14 shown in FIG. 1 and corresponding to the position of lhe workpiece W at work station 12 as shown in FIG. 3H, the several carriages 74, 74B and 74C may be again retracted rightwardly from their positions of FIG. 1, in preparation for shifting the several workpieces leftwardly from their stations shown in FIG. 1 to the next leftwardmost station for the next series of operations to be performed thereon. It will be seen that with the workpieces positioned as above described, there will be no interference between the workpiece and the moving carriages.

After such rightward shifting of carriages, the workpiece W at station 12 may be loaded onto the new carriage 74B for transfer to station 14 in the following manner. First, the positioning member 96 is resiliently urged leftwardly against the workpiece W. The mandrel 26 may then be radially contracted by lowering of the actuating rod 41 by the cylinder 42 of FIG. 1. As a result, the resiliently urged positioning member 96 shifts the workpiece W slightly leftwardly to follow the contraction of the rightward portion of the mandrel 26 to maintain the workpiece firmly gripped between the mandrel 26 and the positioning member 96. Thereafter, the stop block 88 may be shifted rightwardly to its rightwardmost limiting position by the cylinder 92 of FIG. 2, which substantially recenters the workpiece with respect to the contracted mandrel 26 and supports the workpiece between the stop block 88 and the positioning member 96. As a result, the workpiece is now supported upon the carriage 74B as shown in FIG. 3I. Subsequently, the support 21 is raised, thereby raising the mandrel 26 to a position above the workpiece W, as shown in FIG. 3J. A similar sequence occurs at station 15 to place the workpiece W2 upon the new carriage (not shown) by which same will be removed to the output station (not shown) and to remove the corresponding mandrel from such workpiece W2. In a substantially similar way, the workpiece W1 is placed upon the carriage 74C and the legs 56 and 57 are raised to vertically clear such workpiece W1, after the workpiece W1 has completed its 180° of rotation.

Thereafter, the several workpieces W, W1 and W2 may be carried by their new carriages leftwardly to the leftwardly adjacent work stations. In this manner, each workpiece sequenced through the apparatus 10 has a first end machined at station 12, is turned over at station 14 and has its second and remaining end machined at station 15.

MODIFICATIONS

Although the arrangement of the positioning member 96 with respect to the workpiece shown in FIG. 2 has been found suitable, it is contemplated that the positioning means 96 may be modified to apply pressure to the side of the workpiece at a location or locations different from or in addition to that shown in FIG. 2. Such may be desired when, for example, very tall workpieces W are chucked or when the mandrel has expansible portions which are located in the center rather than at the ends thereof.

Figure 11:
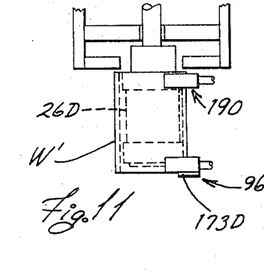
FIG. 11 is a diagrammatic view corresponding generally to FIG. 3B and showing a modification.

Thus, for example, FIG. 11 discloses a workpiece W', mandrel 26D and positioning member 96D arranged as in FIG. 3D, but with a further positioning member 190 located adjacent the upper edge of the workpiece W'. The work support plate 173D of the member 96D is omitted from the member 190, and the positioning member 190 is preferably provided with its own mounting and actuating means, corresponding in general to the slide 97 and cylinder 101 of FIG. 2.

Figure 12:
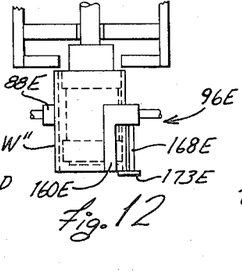
FIG. 12 is a diagrammatic view corresponding generally to FIG. 3B and showing a further modification.

As a further modification, FIG. 12 discloses a positioning member 96E, preferably supported by means corresponding to the slide 97 and guide 98 of FIG. 2, adjacent the longitudinal midpoint of the workpiece W''. The height of the shoe bight portions 160E and pins 168E of the member 96E are increased to enable the workpiece support plate 173E to underlie and support the bottom edge of the workpiece W'. It may be desired to support the stop block 88E for allowing same also to bear against the longitudinal midportion of the workpiece W'', in opposition to the positioning member 96E.

When the modifications of FIGS. 11 and 12 are used in connection with the carriage 74C reciprocable between the stations 15 and 14, the stop block and positioning members 190 and 96E are supported in any convenient manner to allow them to be withdrawn sufficiently from the workpiece as to enable 180° rotation thereof at work station 14.

Although it may be desired to utilize the modified embodiments of FIGS. 11 and 12 in certain instances, it will be noted that the structure thereof is somewhat more complex than the structure of the preferred embodiment of FIGS. 1–10. It may further be noted that the preferred embodiment of FIGS. 1–10 has been found to be satisfactory in all instances of use to which it has been put to date.

Although the present invention has been illustrated in forms of a preferred apparatus wherein the ends of a workpiece are machined in two different chuckings at two different work stations, and to accomplish such was a major objective of the invention, it is contemplated that in certain instances the invention in one of its broader aspects may be implemented in a machining apparatus wherein both workpiece ends are machined at a single work station. For example, a suitable turnover mechanism for the workpiece may be incorporated in such a machining station for reversing the workpiece between end machining operations. Alternatively, the mandrel and its support and actuating mechanism, or the tool, may be made repositionable to accomplish machining of both workpiece ends at the same station by a single tool. Still further, the work station 12 may be rearranged so that two tools are provided, one at each end of the workpiece for simultaneously machining both ends of the workpiece in a single chucking. In such alternative arrangements, it is contemplated that the shoes 157 and 158 may be axially fixed with respect to the yoke 115, rather than axially movable thereon as shown in the drawings, and the abutment ring 46 may be omitted since the finished length of the workpiece will be determined by the relative location of the workpiece ends during the two end machining steps.

Although particular preferred embodiments of the invention have been disclosed in detail for illustrative purposes, it will be recognized that variations and modifications of the disclosed apparatus including the rearrangement of parts, lie within the scope of the present invention.

The embodiments of the invention in which an exclusive property or privilege is claimed are defined as follows:

1. Apparatus for positioning a hollow workpiece in accurate axial alignment with an expandable mandrel located within said workpiece to prevent cocking of said workpiece upon expansion of the mandrel into firm supporting contact with the interior wall of the workpiece, comprising in combina-tion:
   mounting means located exteriorly of said workpiece and movable substantially radially toward and away therefrom;
   yoke means and means connecting said yoke means to said mounting means for limited pivotal movement with respect thereto in at least one plane;
   first and second shoe means engageable with the periphery of said workpiece and means movably mounting said first and second shoe means on said yoke means at spaced locations thereon, said shoe means being engageable with said workpiece at a pair of points circumferentially spaced on said workpiece;
   whereby movement of said mounting means radially toward said workpiece causes said first and second shoe means to engage said workpiece and urge said workpiece radially against said mandrel so that said workpiece engages the said mandrel when the latter is in a nonexpanded condition along a single axial zone of contact, so as to axially align said workpiece with said mandrel in an accurate manner.

2. The apparatus defined in claim 1, in which said means connecting said yoke means and said mounting means comprises a pin having a portion of noncircular cross section and means defining a hole in one of said yoke means and said mounting means, said hole being of noncircular cross section and sized to loosely receive said noncircular cross section portion of said pin, the other of said yoke means and mounting means being engaged with said pin at a portion thereof different from said noncircular cross section portion;
   whereby the loosely interfitted relationship of said portion of said pin and said hole allows pivotal movement of said yoke means with respect to said mounting means in at least one plane and said pivotal movement is limited in extent by abutment of faces of said portion of said pin and said hole.

3. The apparatus defined in claim 2, in which said pin is normally substantially parallel to the axes of said workpiece and mandrel and in which the interrelationship of said pin portion and said hole allows limited pivotal movement of said yoke means with respect to said mounting means in three mutually orthogonal planes, one of which extends substantially radially of said axis of said pin.

4. The apparatus defined in claim 1, in which said yoke means is a substantially C-shaped yoke, said means connecting said yoke and said mounting means is located substantially centrally of said yoke, said first and second shoe means are spaced along said yoke in opposite directions from said means connecting said yoke to said mounting means, said yoke lies in a plane which extends substantially radially of the axis of said mandrel and the paths of movement of said first and second shoe means are substantially parallel to the axis of said mandrel.

5. The apparatus defined in claim 1, including lost motion means for allowing movement of said first and second shoe means substantially linearly of said yoke means and in a direction substantially parallel to the axis of said mandrel;
   whereby said shoe means may be engaged with the periphery of said workpiece and move axially therewith and with respect to said yoke means.

6. The apparatus defined in claim 5, in which said lost motion means include a pair of flanges extending from each of said shoe means in overlapping relation with opposed portions of said yoke means, the spacing of said flanges exceeding the thickness of said portions of said yoke means so as to allow movement of said shoe means with respect to said yoke means in a direction perpendicular to said flanges, the extent of such motion being limited by interference of said flanges with said portions of said yoke means and means extending between said flanges and yoke means for supporting said shoe means on said yoke means for slideable movement in said direction.

7. The apparatus defined in claim 6, in which said means extending between said flanges and said yoke means comprises a pin, one of said yoke means and flanges being fixed to said pin and the other thereof being slideably arranged with respect to said pin.

8. The apparatus defined in claim 1, including abutment means carried at least indirectly by said yoke means and arranged in radially overlapping relation with said workpiece, said abutment means being engageable by the end of said workpiece to enable said shoe means to move with said workpiece as said workpiece moves axially with respect to said mounting means.

9. The apparatus defined in claim 1, in which said means connecting said yoke means to said mounting means allow pivotal of said yoke about three mutually perpendicular axes and wherein the angle of movement about each such axis is less than 90 degrees.

10. Apparatus for accurately positioning a hollow workpiece for end machining operations thereon, comprising in combination:
   first, second and third work stations and conveyor means for transporting the hollow workpiece sequentially past said first, second and third work stations;
   tool means at each of said first and third work stations for machining first and second ends, respectively, of said workpiece;
   first and second expandable mandrels located at said first and third work stations, respectively;
   means at each of said first and third work stations for inserting said expandable mandrels loosely in said workpiece;
   means at each of said first and third work stations for locating said workpiece axially with respect to said mandrels;
   positioning means at each of said first and third work stations and located externally of said workpiece and in radial opposition to said mandrel for urging said workpiece radially against said mandrel during expansion of said mandrel within said workpiece to insure contact of the opposed surfaces of said mandrel and said workpiece along an axially extending zone of contact therebetween so that said workpiece and mandrel are held in axial parallelism during expansion of said mandrel into supporting contact with the interior of said workpiece;
   means for relatively moving said tool means and said mandrel with said workpiece engaged thereby for machining first and second ends of said workpiece at said first and third work stations, respectively;
   means at said second work station for turning said workpiece end-for-end.

11. The apparatus defined in claim 10 in which said positioning means includes contact means capable of contacting the exterior wall of said workpiece at first and second circumferentially spaced points thereon and means for supporting said contact means on said positioning means for at least limited movement with respect thereto in at least one plane;
   means movably supporting said positioning means and means for urging same toward said workpiece and mandrel for causing said contact means to engage said workpiece;
   whereby forcible engagement of said workpiece by said positioning means prior to expansion of said mandrel causes said workpiece to become precisely axially aligned with said mandrel, said contact and alignment being maintained as said mandrel expands into gripping relation with said workpiece.

12. The apparatus defined in claim 10 in which said positioning means includes:
   mounting means located exteriorly of said workpiece and movable substantially radially toward and away therefrom;
   yoke means;
   a pin connecting said yoke means and said mounting means, said pin having a portion of noncircular cross section and means defining a hole in one of said yoke means and said mounting means, said hole being of noncircular cross section for loosely receiving said portion of said pin, the other of said yoke means and mounting means being engaged with said pin at a portion thereof different from said noncircular cross section portion, the loosely interfitted relationship of said portion of said pin and said hole allowing pivotal movement of said yoke means with respect to said mounting means in at least one plane, said pivotal movement being limited in extent by abutment of faces of said portion of said pin and said hole;
   first and second shoe means engageable with the periphery of said workpiece and means movably mounting said first and second shoe means on said yoke means at spaced locations thereon, said shoe means being engageable with said workpiece at a pair of points circumferentially spaced on said workpiece;
   whereby movement of said mounting means toward said workpiece causes said first and second shoe means to engage said workpiece.

13. The apparatus defined in claim 12, in which said pin is normally substantially parallel to the axes of said workpiece and mandrel and in which the interrelationship of said pin portion and said hole allows limited pivotal movement of said yoke means with respect to said mounting means in three mutually orthogonal planes, one of which extends substantially radially of said axis of said pin, said yoke means is substantially a C-shaped yoke, said pins connecting said yoke and said mounting means is located substantially centrally of said yoke, said first and second shoe means are spaced along said yoke in opposite directions from said pins connecting said yoke to said mounting means, said yoke lies in a plane which extends substantially radially of the axis of said mandrel and the pivot axes of said first and second shoe means having pivot axes substantially parallel to the axis of said mandrel; and including
   lost motion means for allowing movement of said first and second shoe means substantially linearly of said yoke means and in a direction substantially parallel to the axis of said mandrel whereby said shoe means may be engaged with the periphery of said workpiece and move axially therewith and with respect to said yoke means, said lost motion means including a pair of flanges extending from each of said shoe means in overlapping relation with opposed portions of said yoke means, the spacing of said flanges exceeding the thickness of said portions of said yoke means so as to allow movement of said shoe means with respect to said yoke means in a direction perpendicular to said flanges, the extent of such motion being limited by interference of said flanges with said portions of said yoke means, an elongate pin extending between said flanges and yoke means for supporting said shoe means on said yoke means for slideable movement in said direction, one of said yoke means and flanges being fixed to said elongate pin and the other thereof being pivotally arranged with respect to said elongate pin whereby the interconnection of said yoke means and shoe means allows both pivotal and axial movement of said shoe means with respect to the axis of said elongate pin.

* * * * *